US008660515B2

(12) United States Patent
Malachowsky

(10) Patent No.: US 8,660,515 B2
(45) Date of Patent: Feb. 25, 2014

(54) INTEGRATED WIRELESS TRANSCEIVER AND AUDIO PROCESSOR

(75) Inventor: Chris Alan Malachowsky, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 227 days.

(21) Appl. No.: 12/952,147

(22) Filed: Nov. 22, 2010

(65) Prior Publication Data

US 2011/0076947 A1 Mar. 31, 2011

Related U.S. Application Data

(63) Continuation of application No. 10/987,020, filed on Nov. 11, 2004, now abandoned.

(51) Int. Cl.
*H04B 1/28* (2006.01)

(52) U.S. Cl.
USPC ........ 455/333; 455/41.2; 455/334; 455/550.1

(58) Field of Classification Search
USPC ............... 455/41.2, 41.3, 260, 323, 333, 334, 455/550.1
See application file for complete search history.

(56) References Cited

U.S. PATENT DOCUMENTS

| | | | | |
|---|---|---|---|---|
| 5,428,669 | A | 6/1995 | McCarthy | |
| 5,493,698 | A * | 2/1996 | Suzuki et al. | 370/280 |
| 5,877,821 | A | 3/1999 | Newlin et al. | |
| 6,636,749 | B2 | 10/2003 | Holmes et al. | |
| 6,778,824 | B2 | 8/2004 | Wonak et al. | |
| 6,947,068 | B2 * | 9/2005 | Forkner et al. | 348/14.07 |
| 6,957,092 | B2 | 10/2005 | Kotzin | |
| 7,173,986 | B2 * | 2/2007 | Wu | 375/343 |
| 7,349,722 | B2 | 3/2008 | Witkowski et al. | |
| 2001/0003089 | A1 * | 6/2001 | Kroeger et al. | 455/45 |
| 2001/0054060 | A1 | 12/2001 | Fillebrown et al. | |
| 2004/0033821 | A1 | 2/2004 | Slesak et al. | |
| 2004/0092253 | A1 | 5/2004 | Simonds et al. | |
| 2004/0132407 | A1 | 7/2004 | Hein-Magnussen et al. | |
| 2005/0018860 | A1 * | 1/2005 | Furge et al. | 381/86 |
| 2005/0130593 | A1 | 6/2005 | Michalak | |
| 2005/0245191 | A1 | 11/2005 | Falcon | |
| 2006/0019609 | A1 | 1/2006 | Finley et al. | |
| 2006/0019713 | A1 | 1/2006 | Rokusek et al. | |

FOREIGN PATENT DOCUMENTS

| | | |
|---|---|---|
| JP | 08-153075 | 6/1996 |
| KR | 2002-80557 | 10/2002 |
| KR | 2004-64587 | 7/2004 |

* cited by examiner

*Primary Examiner* — Nhan Le
(74) *Attorney, Agent, or Firm* — Kilpatrick Townsend & Stockton LLP

(57) ABSTRACT

Circuits, methods, and apparatus incorporate both a wireless physical interface and audio processing unit on a single integrated circuit. The wireless physical interface may include a receiver, transmitter, or a complete transceiver. The audio processing unit is typically in communication with both the wireless interface and one or more wired physical interfaces. The integrated circuit may be as simple as a wireless physical interface and audio processing unit, or it may include other circuits such as graphics processors, networking interfaces, memories, or other circuits.

16 Claims, 6 Drawing Sheets

INTEGRATED WIRELESS TRANSCEIVER AND AUDIO PROCESSOR

This application is a continuation of U.S. application Ser. No. 10/987,020, filed Nov. 11, 2004, which is hereby incorporated by reference.

BACKGROUND

The present invention relates generally to audio and wireless integrated circuits and more specifically to integrated circuits including both wireless transceivers and audio processors.

Computers are leaving the confines of the office and are heading to our family rooms. Once there, they are taking on the role of a provider of entertainment including video and audio information. This means that computer systems need to be designed to handle and process audio data in new and more efficient ways—systems designed for spread sheets and silent web pages could likely be improved.

NVIDIA Corporation of Santa Clara, Calif., has recently developed a breakthrough technology known as distributed processing. NVIDIA is currently applying the principles and benefits of distributed processing to various computational tasks such as graphics, networking, and other functions. Simply put, distributed processing allocates the computational load of an electronic system to the circuits in the system that are best able to efficiently handle the individual tasks.

Accordingly, NVIDIA has been applying the benefits of distributed processing to audio information. By off-loading audio processing from a central processing unit to a more specialized audio processing unit, the CPU is freed to perform other tasks and the audio related tasks are completed more efficiently by the specialized APU.

At the same time, as our computers join us in the family room, we would appreciate it if they left their tangled and unsightly wires behind. The fun of having a nice surround sound system is somewhat diminished if wires are spread around in a spider-web fashion. This cabling can be discarded by using one or more of the various wireless technologies that are currently available or that will be developed in the future.

Thus, what is needed are circuits, methods, and apparatus that make use of the concept of distributed processing in order to spread the computational workload, while at the same time incorporating wireless technology to ease the clutter that would otherwise be created.

SUMMARY

Accordingly, embodiments of the present invention provide circuits, methods, and apparatus that incorporate both a wireless physical interface and audio processing unit on a single integrated circuit. The wireless physical interface may include a receiver, transmitter, or a complete transceiver. The audio processing unit is typically in communication with both the wireless interface and one or more wired physical interfaces. The integrated circuit may be as simple as a wireless physical interface and audio processing unit, or it may include other circuits such as graphics processors, networking interfaces, memories, memory interfaces, or other circuits. Various embodiments of the present invention may make use of one or more of these or the other features described herein.

An exemplary embodiment of the present invention provides an integrated circuit. This integrated circuit includes a wireless receiver configured to receive audio information in the form of a first RF signal consistent with a wireless standard or protocol, an audio processor coupled to the wireless transceiver configured to process the audio information, and an output cell configured to provide the processed audio information.

A further exemplary embodiment of the present invention provides another integrated circuit. This integrated circuit includes an input cell configured to receive audio information, an audio processor coupled to the input cell and configured to process the audio information, and a wireless transmitter configured to receive the processed audio information and transmit it in the form of an RF signal consistent with a wireless standard or protocol.

Yet a further exemplary embodiment of the present invention provides a method of receiving and processing audio information. This method includes establishing a wireless communication link, receiving audio information over the communication link using a receiver on the integrated circuit, processing the audio information using a processor on the integrated circuit, and outputting the processed audio information.

Still another further exemplary embodiment of the present invention provides a method of transmitting processed audio information. This method includes receiving audio information with a processing circuit on an integrated circuit, processing the audio information with the processing circuit, establishing a wireless communication link, and transmitting the processed audio information over the wireless communication link using a wireless transmitter on the integrated circuit.

A better understanding of the nature and advantages of the present invention may be gained with reference to the following detailed description and the accompanying drawings.

DESCRIPTION OF EXEMPLARY EMBODIMENTS

Figure 1:
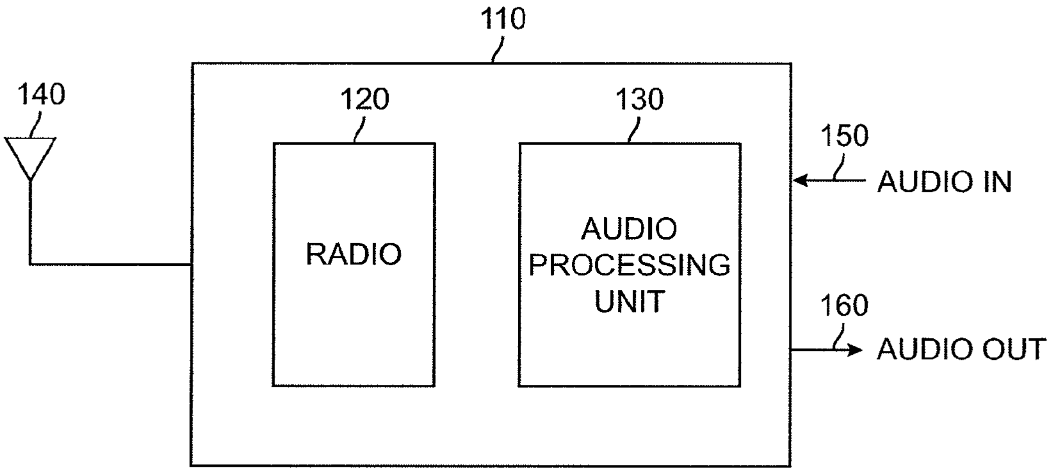
FIG. 1 is a block diagram of an integrated circuit consistent with an embodiment of the present invention.

FIG. 1 is a block diagram of an integrated circuit consistent with an embodiment of the present invention. This block diagram includes an integrated circuit 110, which further includes a radio 120 and audio processing unit 130. The radio 120 may include a transmitter, a receiver, or both a transmitter and receiver, that is, a transceiver. The radio 120 transmits or receives radio frequency signals via antenna 140. The audio processing unit 130 receives audio information via input port 150, and provides audio information via output port 160. Various embodiments of the present invention may not include the audio input port 150 or audio output port 160.

The radio 120 may be connected to the antenna 140 through a radio frequency choke, filter, matching impedance, or other circuitry. This circuitry may be on or off-chip depending on the exact implementation. The audio processing unit 130 may receive audio information on ports 150 via an input cell or cells (not shown). Similarly, the audio processing unit 130 may provide audio information on output ports 160 via an output cell or cells (also not shown). The integrated circuit 110 may include other functional blocks, such as a graphics processing unit, general processing units, memories, or other circuits.

The radio 120, as well as the other radios, transceivers, receivers, and transmitters included in these examples, may be consistent with one or more standards or protocols, or proprietary signaling conventions. These standards or protocols may be, for example, long range or short range RF standards or protocols. The radio 120 may be consistent with a short range standard or protocol such as Bluetooth, 802.11a, b, or g, or FM or AM standards. Similarly, the audio input port 150 and output port 160, as well as the other ports included in these examples, may be consistent with one or more standards or protocols, or proprietary signaling conventions. For example, the audio input port 150 and output port 160 may be consistent with SPDIF, RCA, or other audio connection standards. These wireless, input, and output circuits may be compatible with existing standards or protocols and proprietary signaling conventions. Further, in the future, new standards or protocols and proprietary signaling conventions will be developed and these may be used by embodiments of the present invention.

Combining the radio 120 and audio processing unit 130 on the integrated circuit 110 provides several benefits. For example, some of the functions of the radio of 120 may be incorporated into the audio processing unit 130. The interface between the radio 120 and audio processing unit 130 may be very sophisticated since interface signals are not driven off chip. Also, since the signals are not driven off-chip, the electrical switching noise and coupling that would otherwise result is reduced, thus improving radio performance. Further, the audio processing unit 130 can be custom tailored to process signals received from the radio 120 and to provide signals to the radio 120 for transmission.

Previous CMOS solutions for radio frequency circuits have been somewhat lacking in performance. Recent developments have made CMOS a much more viable technology for these receivers and transmitters. By incorporating both a radio and audio processing unit on a single chip, the advantages of CMOS may be realized for the processor without severely compromising radio performance. The use of CMOS allows the manufacture of these integrated circuits using well known low cost processes, thus reducing overall system costs. Further, the low power of CMOS allows these devices to be incorporated in portable, battery powered devices.

Integration of the radio and audio processing unit into a signal chip means that the processor is under the same temperature, process, and voltage conditions as the radio. This awareness means that the processor can better compensate for these effects on radio performance.

While advantages of an all CMOS device have been outlined, one skilled in the art will appreciate that other processes, such as group III-V processes, BiCMOS, bipolar, SiGe, or other process could be used, and that each of these would bring its own advantages.

Figure 2:
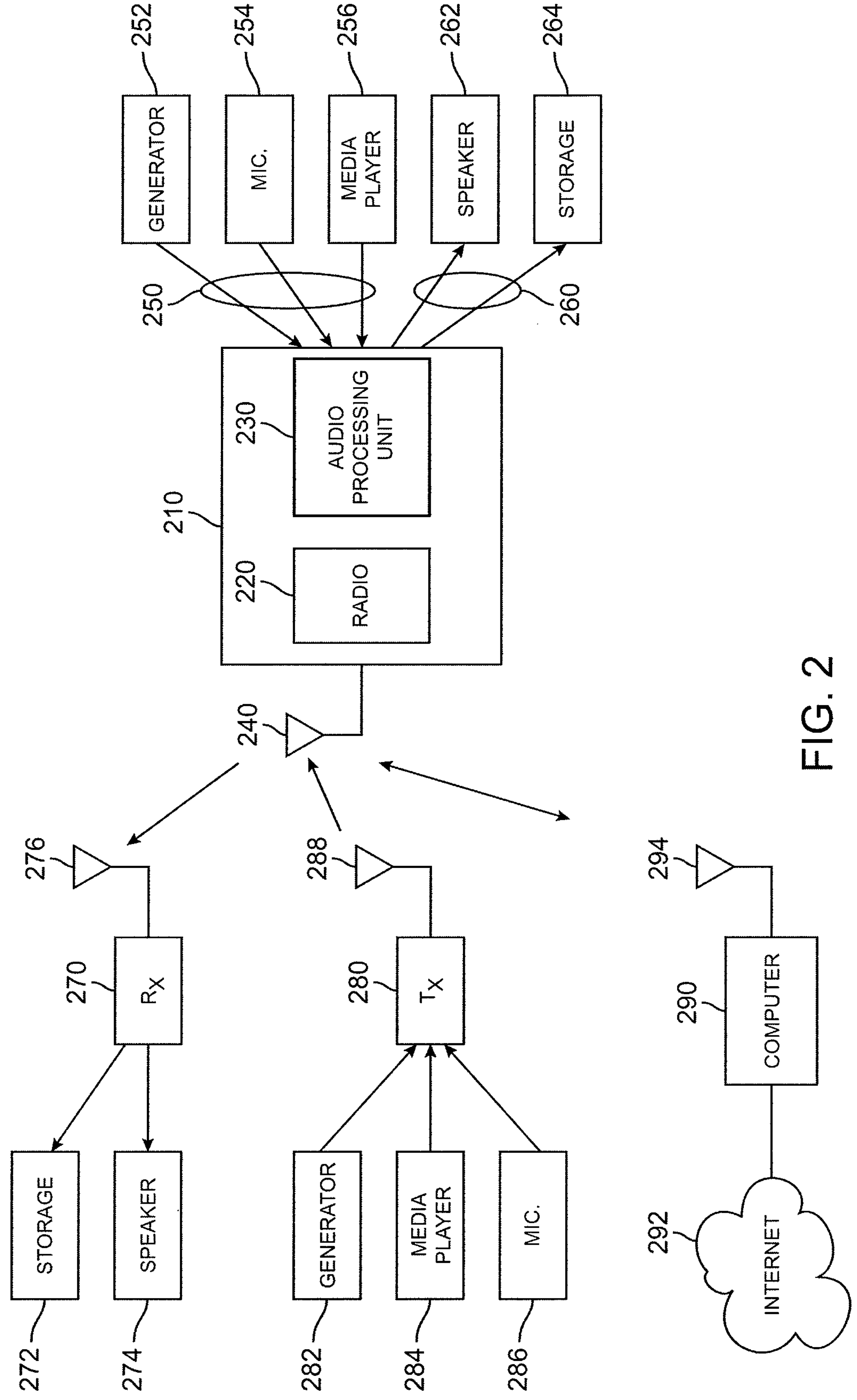
FIG. 2 is a block diagram of a system including an integrated circuit consistent with an embodiment of the present invention.

FIG. 2 is a block diagram of a system including an integrated circuit consistent with an embodiment of the present invention. This block diagram includes an integrated circuit

210, which further includes radio 220 and audio processing unit 230. The radio 220 transmits and receives radio frequency signals via antenna 240. The audio processing unit 230 receives audio input signals via input port 250, and provides audio output signals via output port 260.

The radio 220 transmits signals to a receiver 270 and receives signals from a transmitter 280. The radio 220 also sends signals to or receives signals from a computer 290. The audio processing unit 230 receives signals via an input port 250, typically using an input cell, which is not shown for clarity. The audio processing unit 230 also provides output signals via output port 260, again typically using an output cell or cells, which are also not shown for clarity.

The receiver 270 receives signals on its antenna 276 from the radio 220 via its antenna 240. The receiver 270 in turn provides audio signals to a storage device 272 and speaker 274. The storage device 272 may be a memory, disk drive, or other storage device. The speaker 274 may be a set of headphones, or other type of speaker or speakers.

The radio 220 also receives signals from transmitter 280 via its antenna 288. The transmitter 280, in this particular example, receives signals from a generator 282, media player 284, and microphone 286. The generator 282 may be a computer or computer network, electronic music instrument, or other circuit capable of generating audio signals. The audio signals may also be received from a microphone 254. This microphone or transducer 254 converts physical signals such as sound to electronic signals for processing by the audio processing unit 230. In this particular example, signals may also be received from a media player 256. This media player may be a CD player, a DVD player, digital audiotape player, or other type of media player.

In this particular embodiment, the audio processing unit 230 receives signals from an audio signal generator 252, microphone 254, and media player 256. The generator 252 may be a computer or computer network, electronic music instrument, or other circuit capable of generating audio signals. The audio signals may also be received from a microphone 254. This microphone or transducer 254 converts physical signals such as sound to electronic signals for processing by the audio processing unit 230. In this particular example, signals may also be received from a media player 256. This media player may be a CD player, DVD player, digital audiotape player, satellite radio receiver, or other type of media player.

Also in this particular example, audio signals are provided via output port 260 to a speaker 262 and storage device 264. The speaker 262 may be a set of headphones, or other type of speaker or speakers. The storage circuit 264 may be a memory, a hard drive, a CD or DVD recorder, or other storage device.

In this exemplary block diagram, the radio 220 is shown as communicating with a receiver 270, transmitter 280, and computer 290. It will be appreciated by one skilled in the art that in other embodiments of the present invention, the radio 220 may be in communication with either fewer or more devices than those illustrated. Further, the receiver 270, transmitter 280, and computer 290, are shown connected to a number of exemplary devices. It will also be appreciated by one skilled in the art that the receiver 270, transmitter 280, and computer 290 may be connected to fewer or more than the devices illustrated. Also, input port 250 and output port 260 are shown as connected to a number of exemplary devices. Again, it will be appreciated by one skilled in the art that the input port 250 and output port 260 may be connected to fewer or more devices than those illustrated.

Figure 3:
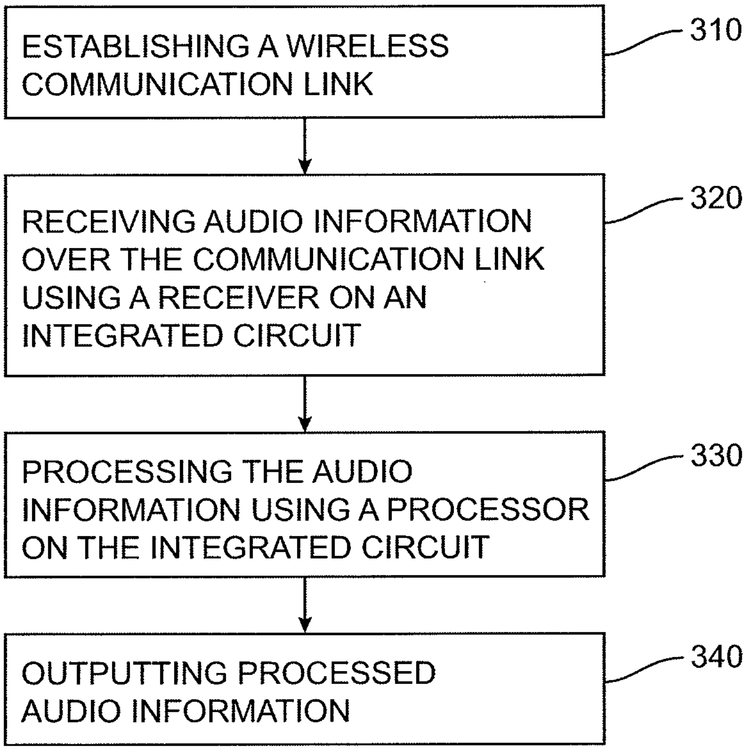
FIG. 3 is a flow chart of a method of receiving and processing audio information consistent with an embodiment of the present invention.

FIG. 3 is a flow chart of a method of receiving and processing audio information consistent with an embodiment of the present invention. In act 310, a wireless communications link is established. It act 320, audio information is received over the communications link using a receiver on an integrated circuit. The audio information is processed using a processor, which is also on the integrated circuit, in act 330. It act 340, the processed audio information is output.

Figure 4:
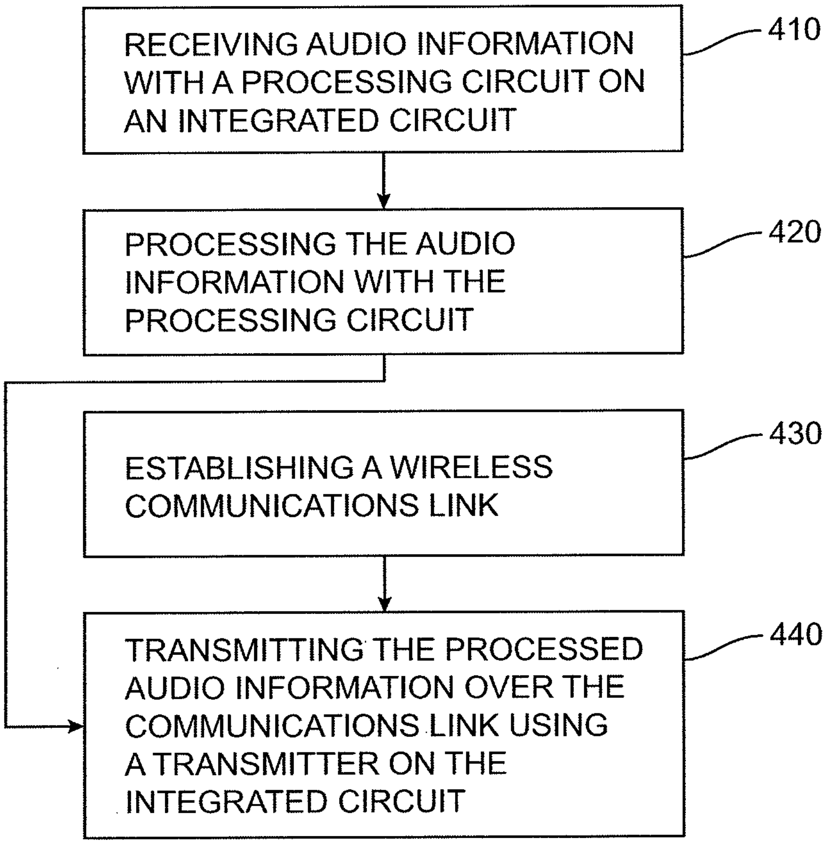
FIG. 4 is a flow chart of a method of processing and transmitting audio information consistent with an embodiment of the present invention.

FIG. 4 is a flow chart of a method of processing and transmitting audio information consistent with an embodiment of the present invention. In act 410, audio information is received by a processing circuit on an integrated circuit. In act 420, the audio information is processed using the processing circuit on the integrated circuit. In act 430, a wireless communications link is established. The processed audio information is transmitted over the communications link using a transmitter that is on the integrated circuit, in act 440.

Figure 5:
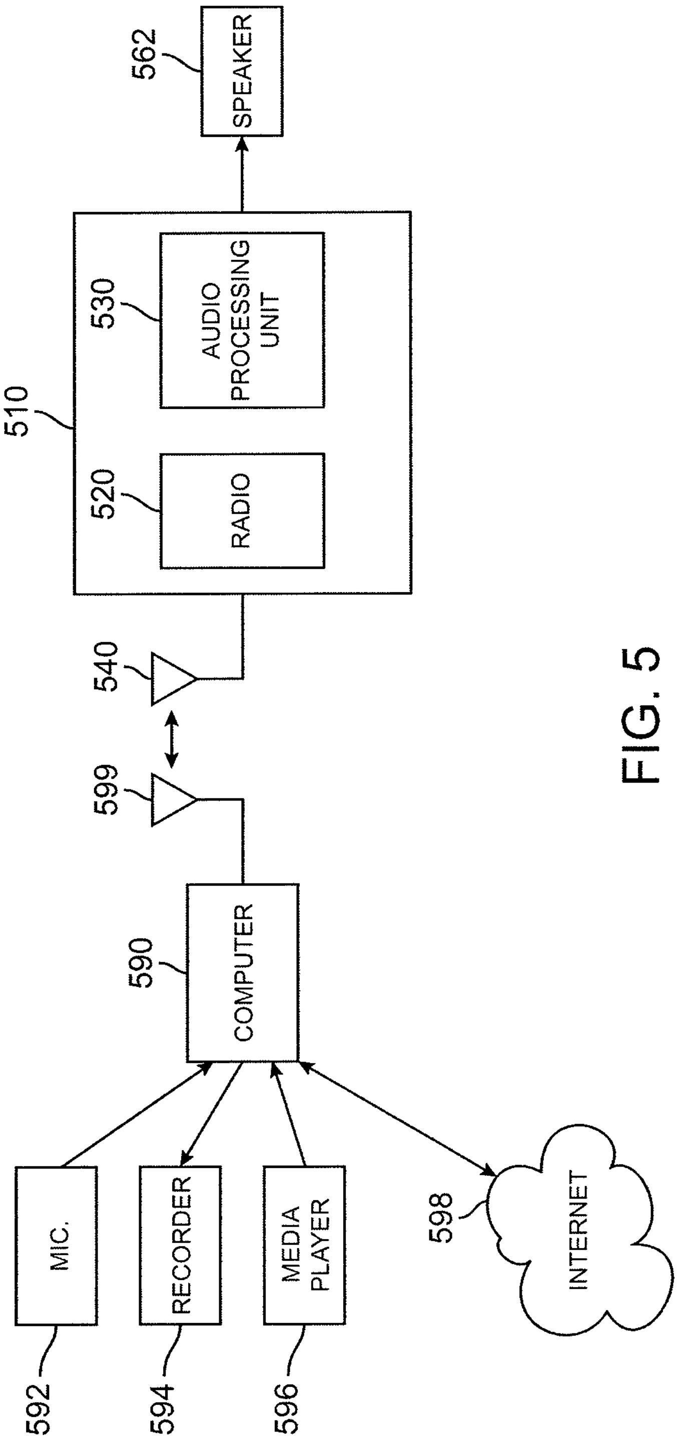
FIG. 5 is a block diagram of another system including an integrated circuit consistent with an embodiment of the present invention.

FIG. 5 is a block diagram of another system including an integrated circuit consistent with an embodiment of the present invention. This block diagram includes an integrated circuit 510, which further includes a radio 520 and audio processing unit 530. The radio 520 sends signals to and receives signals from a computer 590. The audio processing unit 530 provides an audio output signal to one or more speakers 562.

In this particular example, the computer 590 receives signals from a microphone 592, media player 596, and the Internet 598. The computer 590 also provides signals to a recorder 594 as well as to the Internet 598.

In this particular embodiment, the computer 590 is able to receive signals from a number of sources, and provide them the radio 520 via its antenna 540. The radio 520 in turn provides the signals to the audio processing unit 530. The audio processing unit can be used to mix, overlay, or combine the signals from these various sources. Also, the audio processing unit is able to perform other functions, such as preprogrammed functions that are available on the integrated circuit 510. Also, the integrated circuit 510 may include memory circuits which can provide audio signals that may be used instead of or in combination with the other signals provided by the computer 590.

Figure 6:
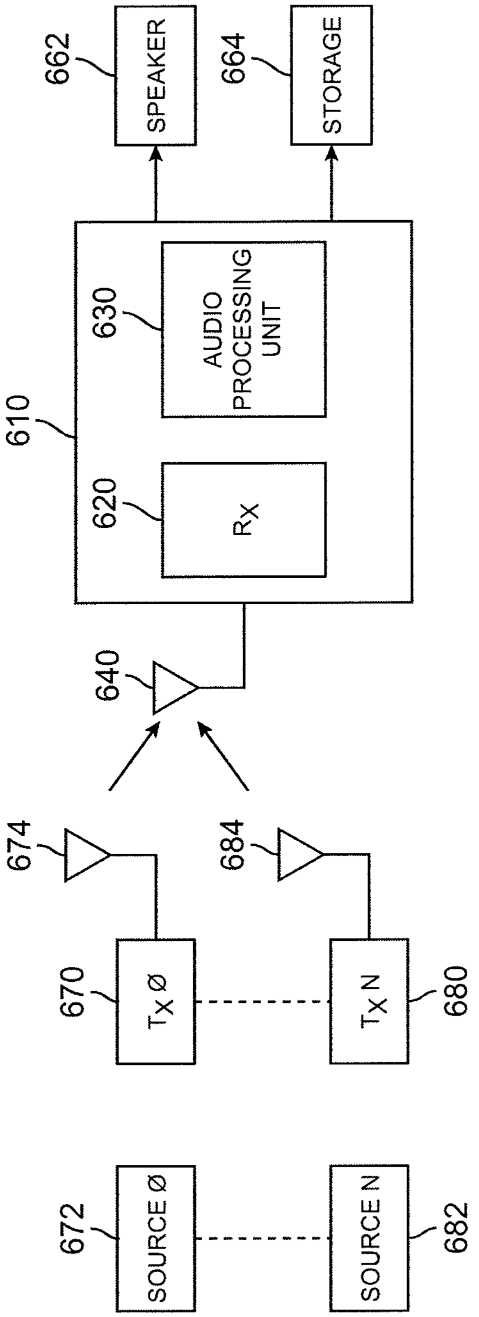
FIG. 6 is a block diagram of another system including an integrated circuit consistent with an embodiment of the present invention.

FIG. 6 is a block diagram of another system including an integrated circuit consistent with an embodiment of the present invention. This block diagram includes an integrated circuit 610, which further includes a receiver 620 and audio processing unit 630. The receiver 620 receives audio signals from a number of transmitters TX0 670 through TXN 680.

In this particular example, transmitter TX0 670 receives a signal from source 672 and provides an output signal on its antenna 674. The integrated circuit 610 receives the signal via antenna 640 using receiver 620. Similarly, transmitter TXN 680 receives an audio signal from source 682 and provides an output signal via its antenna 684. The integrated circuit 610 receives this audio signal via its antenna 640 using the receiver 620. The audio processing unit 630 processes the received audio signals from the various sources and provides outputs to speaker 662 and storage unit 664.

In this specific embodiment, the audio processing unit 630 receives input data from a number of sources 672 through 682 via receiver 620. The audio processing unit 630 may then blend, overlay, mix, synthesize, or otherwise process the signals to generate one or more outputs. These outputs may then be listened to, for example over speakers 662, or stored, for example, by storage device 664.

In the above examples, particular equipment devices were shown for exemplary purposes. In other systems consistent with embodiments of the present invention, other devices may be included. Some of these devices may be currently known or available, but not listed for reasons of expediency. Other devices will surely be developed and then may be incorporated by embodiments of the present invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:

a wireless receiver to receive a first wireless signal carrying first audio information from a first source and a second wireless signal carrying second audio information from a second source;

an audio processor coupled to the wireless transceiver to receive the first audio information and the second audio information from the wireless receiver and to blend the first audio information and the second audio information to generate first processed audio information; and an output cell to provide the first processed audio information.

2. The integrated circuit of claim 1 wherein the wireless receiver demodulates the first wireless signal received from the first source and the second wireless signal received from the second source.

3. The integrated circuit of claim 2 wherein the first wireless signal is compliant with a wireless standard that is a short range RF standard.

4. The integrated circuit of claim 3 wherein the short range RF standard is one of the group consisting of IEEE 802.11a, IEEE 802.11b, IEEE 802.11g, and Bluetooth.

5. The integrated circuit of claim 1 wherein the audio processor also mixes the first audio information and the second audio information.

6. The integrated circuit of claim 1 wherein the output cell provides the first processed audio information to a speaker.

7. The integrated circuit of claim 1 wherein the output cell provides the first processed audio information to a storage unit.

8. The integrated circuit of claim 1 wherein the audio processor further performs one of the group consisting of mixing, overlaying, and synthesizing.

9. The integrated circuit of claim 1 further comprising:

an input cell to receive audio information; and a wireless transmitter to receive second processed audio information and transmit the second processed audio information in the form of a third wireless signal, wherein the audio processor is further coupled between the input cell and the wireless transmitter.

10. An integrated circuit comprising:

a wireless receiver to receive first audio information in the form of a first RF signal consistent with a wireless standard and to receive second audio information in the form of a second RF signal consistent with a wireless standard;

an audio processor coupled to the wireless transceiver to mix the first audio information and the second audio information; and an output cell coupled to the audio processor to provide the mixed audio information.

11. The integrated circuit of claim 10 wherein the wireless receiver demodulates the first RF signal and the second RF signal.

12. The integrated circuit of claim 11 wherein the wireless standard is a short range RF standard.

13. The integrated circuit of claim 12 wherein the short range RF standard is one of the group consisting of IEEE 802.11a, IEEE 802.11b, IEEE 802.11g, and Bluetooth.

14. The integrated circuit of claim 10 wherein the audio processor further performs one of the group consisting of blending, overlaying, and synthesizing.

15. An integrated circuit comprising:

a wireless receiver to receive a first wireless signal carrying first audio information from a first source and a second wireless signal carrying second audio information from a second source;

an audio processor coupled to the wireless transceiver to receive the first audio information and the second audio information from the wireless receiver and to synthesize the first audio information and the second audio information to generate first synthesized audio information; and an output cell to provide the first processed audio information.

16. The integrated circuit of claim 15 wherein the audio processor further performs one of the group consisting of mixing, overlaying, and blending.

* * * * *